United States Patent [19]
Linkner, Jr. et al.

[11] Patent Number: 5,895,026
[45] Date of Patent: Apr. 20, 1999

[54] FOIL WOUND COIL FOR A SOLENOID VALVE

[75] Inventors: Herbert L. Linkner, Jr.; Paul M. Schliebe, both of Dexter, Mich.

[73] Assignee: Kelsey-Hayes Company, Romulus, Mich.

[21] Appl. No.: 08/811,650

[22] Filed: Mar. 5, 1997

Related U.S. Application Data

[60] Provisional application No. 60/012,928, Mar. 6, 1996, and provisional application No. 60/020,536, Jun. 28, 1996.

[51] Int. Cl.$^6$ .............................. F16K 31/06; H01F 5/04
[52] U.S. Cl. ............... 251/129.15; 335/282; 336/206
[58] Field of Search ..................... 251/129.15; 335/282, 335/299; 242/444.3; 336/206, 177

[56] References Cited

U.S. PATENT DOCUMENTS

| | | | |
|---|---|---|---|
| 3,225,269 | 12/1965 | Worcester | 335/282 |
| 3,233,154 | 2/1966 | Hnilicka, Jr. | 335/299 X |
| 3,247,476 | 4/1966 | Pintell | 336/177 |
| 3,466,581 | 9/1969 | Albrecht et al. | 335/299 X |
| 3,494,453 | 2/1970 | Sepko | 335/299 X |
| 3,891,955 | 6/1975 | Horton, III | 336/205 |
| 3,961,417 | 6/1976 | George | 29/605 |
| 4,060,784 | 11/1977 | Fergestad | 336/84 R |
| 4,086,552 | 4/1978 | Baggermans | 336/119 |
| 4,092,621 | 5/1978 | Nyswander et al. | 336/184 |
| 4,236,133 | 11/1980 | Seiersen | 336/69 |
| 4,295,113 | 10/1981 | Bjorklund et al. | 336/84 M |
| 4,323,870 | 4/1982 | Moritz et al. | 336/206 |
| 4,471,335 | 9/1984 | Moritz et al. | 336/206 |
| 4,660,014 | 4/1987 | Wenaas et al. | 336/84 C |
| 4,829,401 | 5/1989 | Vranken | 361/380 |
| 5,162,089 | 11/1992 | Halter | 264/40.1 |
| 5,183,606 | 2/1993 | Predohl | 264/40.1 |
| 5,250,922 | 10/1993 | Forsberg et al. | 336/60 |
| 5,296,828 | 3/1994 | Feinstein, Jr. et al. | 335/300 |

*Primary Examiner*—John Rivell
*Attorney, Agent, or Firm*—MacMillan, Sobanski & Todd, LLC

[57] ABSTRACT

A solenoid coil formed by winding a conductive foil tape upon a sleeve and method for making same. The coil includes a free standing wire termination which is wound into the coil. Alternately, the end of the foil tape can be folded to form a coil termination.

15 Claims, 11 Drawing Sheets

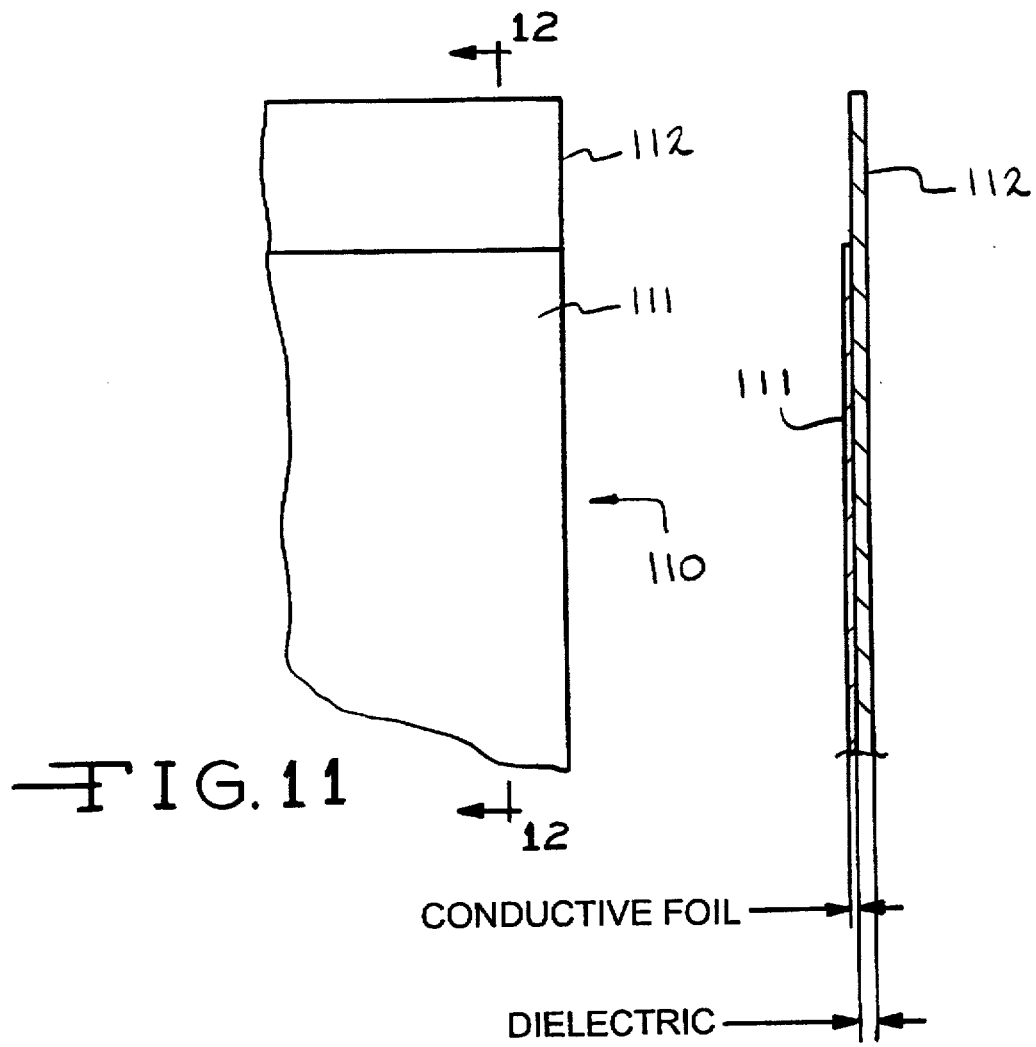
FIG. 11
CONDUCTIVE FOIL
DIELECTRIC
FIG. 12
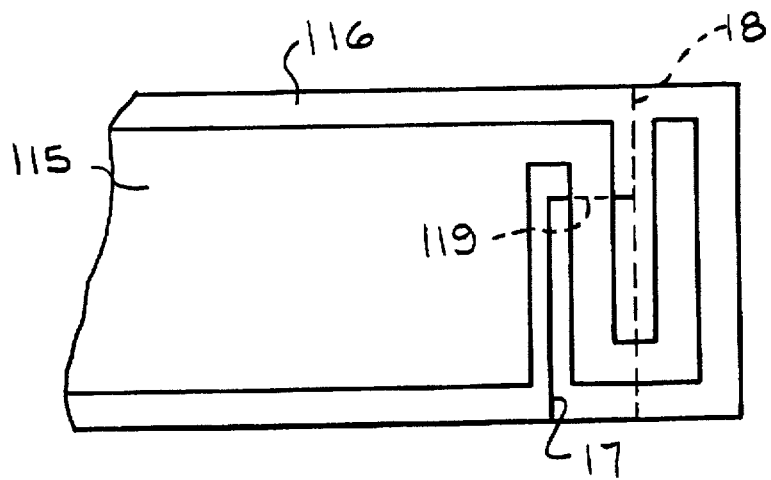
FIG. 13

FOIL WOUND COIL FOR A SOLENOID VALVE

CROSS REFERENCE TO RELATED APPLICATIONS

This application claims the benefit of U.S. Provisional Application No. 60/012,928, filed Mar. 6, 1996 and of U.S. Provisional Application No. 60/020,536, filed Jun. 28, 1996.

BACKGROUND OF THE INVENTION

This invention relates in general to solenoid valves for anti-lock brake systems and in particular to foil wound coils for actuating the solenoid valves.

An Anti-lock Brake System (ABS) is often included as standard equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an electronic control module which has a microprocessor. The control module is electrically coupled to the pump motor, a plurality of solenoid coils associated with the solenoid valves and wheel speed sensors for monitoring the speed and deceleration of the controlled wheels. The control module is typically mounted upon the control valve body to form a compact unit which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

Referring now to FIG. 1, there is shown a sectional view of a typical ABS solenoid valve 10 mounted upon an ABS control valve body 11. The valve 10 includes an axially shiftable armature 12 which is biased in an upward direction by a spring 13 such that a ball valve, generally represented by a reference numeral 14, is maintained in a normally open position. The ball valve 14 cooperates with a valve seat member 15 which is mounted in the valve body 11. The armature 12 is slideably disposed within a valve sleeve 16 having a closed end. A solenoid coil 20 is carried by the valve sleeve 16 and surrounds the armature 12. The coil 20 is enclosed by a metal flux return casing 21. An annular flux ring 22 is disposed within the open end of the flux casing 21. The flux return casing 21 flux ring 22 complete a magnetic flux path which passes through the armature 12 and the valve seat member 15.

The solenoid coil 20 is of conventional design, comprising a winding 23 formed from multiple turns of an insulated magnet wire having a round cross section, such as #28 ½ magnet wire. The coil wire is helically wound upon a plastic bobbin 24. A pair of terminal pin supports 25 extend in an axial direction from the top of the bobbin 24. Each of the supports 25 is molded over a terminal pin 26. An end 27 of the coil winding wire is wound around the base of each of the terminal pins 26 and soldered thereto. The pins 26 are electrically coupled to the ABS microprocessor.

When it is necessary to actuate the valve 10 during an anti-lock braking cycle, an electric current is supplied through the terminal pins 26 to the coil 20. The current establishes a magnetic field in the armature 12 which pulls the armature 12 in a downward direction, closing the ball valve 14. When the current is interrupted, the magnetic field collapses, allowing the spring 13 to return the armature 12 to its original position, thereby reopening the ball valve 14. An ABS control unit also typically includes other solenoid valves, such as normally closed solenoid valves (not shown), which have structures similar to the normally open valve 10 described above.

SUMMARY

This invention relates to a foil wound solenoid coil for an ABS solenoid valve and a method of making such a coil.

During the operation of an ABS, the solenoid valves are repeatedly actuated and deactuated to control the hydraulic pressure applied to the controlled wheel brakes. The ABS electronic control unit actuates a particular solenoid valve by supplying an electric current to the solenoid coil associated with the valve. Similarly, the control unit deactuates the solenoid valve by interrupting the electric current supplied to the associated solenoid coil. The valve is returned to its deactuated state by a spring as the magnetic field generated by the current flowing through the coil collapses. However, the inductance and geometry of conventional solenoid coils, which are helically wound from wire, can slow the collapse of the magnetic field. The slow magnetic field collapse extends the response time of the valve, which can affect the overall operation of the ABS. Accordingly, it would be desirable to reduce the amount of time required for the magnetic field generated by the coil to collapse. It also would be desirable to reduce the stress on the electronic components included in the ABS electronic control unit.

The present invention contemplates winding the coils for ABS solenoid valves from a wide foil. When a solenoid is de-energized, the magnetic field does not collapse at a symmetrical rate. This unsymmetrical magnetic field collapse generates electric field differentials in a foil wound solenoid coil which do not exist in a conventional helically wound wire coil. The electric field differentials extend axially within the foil coil and can form small eddy loops which dissipate magnetic energy. The dissipation of magnetic energy accelerates the magnetic field collapse which, in turn, shortens the response time for the solenoid to release. The dissipation of magnetic energy by the eddy currents reduces the amount of energy which flows through the electronic components included in the ABS control unit. Accordingly the stress on the electronic components is reduced.

The foil wound solenoid coil contemplated by the invention comprises a central tube and a winding which includes an electrically conducting foil tape spiral wound about the tube. The electrically conducting tape includes an electrically conductive material carried by a flexible dielectric tape.

Additionally, a coil terminal is formed upon an end of the foil tape. The terminal can include a wire wound into said foil tape, the wire extending from an end of the coil. Alternately, the coil terminal can be formed in the end of the foil tape, the resulting foil terminal extending from an end of the coil. It also is contemplated that the tube can be formed from an electrically conducting material and the winding is wound with the electrically conductive material contacting the tube.

The foil coil can include at least one disc formed from an electrically insulative material disposed upon an end of the coil. Also the electrically conductive material forming the foil tape can be recessed from at least one edge of the dielectric tape.

It is further contemplated that the electrically conducting foil can be wound directly upon the sleeve which contains the solenoid valve armature.

The invention also contemplates a method for forming coils for ABS solenoid valves comprising the steps of providing a tube which is mounted upon a coil winding machine and winding a length of an electrically conductive foil tape in a spiral about the tube.

It is further contemplated that the tube provided has a length which is a multiple of the length of an individual coil and the foil tape has a width which corresponds to the length of the tube and that subsequent to winding the tape upon the tube, the tube and tape winding is sliced into a plurality of individual coils. Before winding the tape upon the tube, a wire can be inserted into the winding parallel to the axis of the tube. The wire would have a plurality of loops formed therein which are spaced to provide one loop in each of the individual coils. After slicing the tube and winding into individual coils, the loops are bent parallel to the axis of the coil to form a coil lead wire. Alternately, the end of the foil tape can be folded into a foil terminal tab.

Additionally, subsequent to slicing the tube and tape winding, at least one end of at least one of the individual coils is placed in a etching fluid, the etching fluid dissolving a portion of the electrically conductive material. After etching the coil end, a disc formed from an electrically insulative material is attached to at least one end of the coil.

After forming the foil coil, the foil coil is inserted into a flux casing having an arpeture formed therethrough, the coil lead extending through the casing arpeture. A flux ring is then inserted into the open end of the flux casing to retain the coil within the flux casing.

It also is contemplated that the foil tape is fabricated having an electrically conductive material deposited upon a flexible dielectric tape with the electrically conductive material being narrower than the flexible dielectric tape. The electrically conductive material is positioned upon the dielectric tape such that at least one edge of the electrically conductive material is recessed from one of the edges of the dielectric tape. Additionally, a foil tape can be fed directly from fabrication to the foil winding machine for winding the foil coil.

BRIEF DESCRIPTION OF THE DRAWINGS

FIG. 11 illustrates an alternate structure for the foil tape forming the coil shown in FIG. 2.

FIG. 12 is a partial sectional view of the tape shown in FIG. 11 taken along line 12—12.

FIG. 13 is a partial view of an end of the tape used to wind the foil coils.

DETAILED DESCRIPTION OF THE PREFERRED EMBODIMENT

Figure 1:
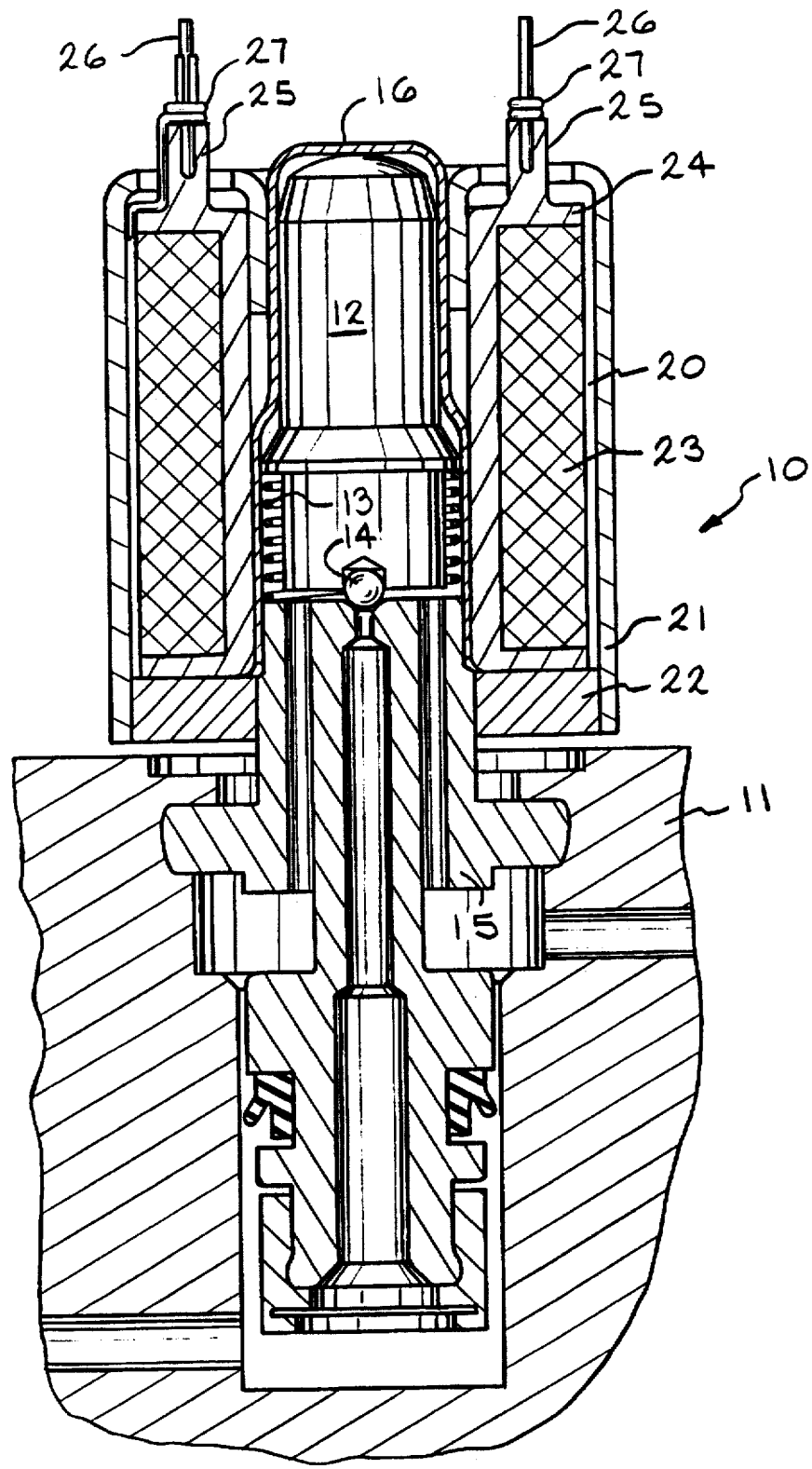
FIG. 1 is a sectional view of an ABS solenoid valve having a coil wound according to the prior art.
Figure 2:
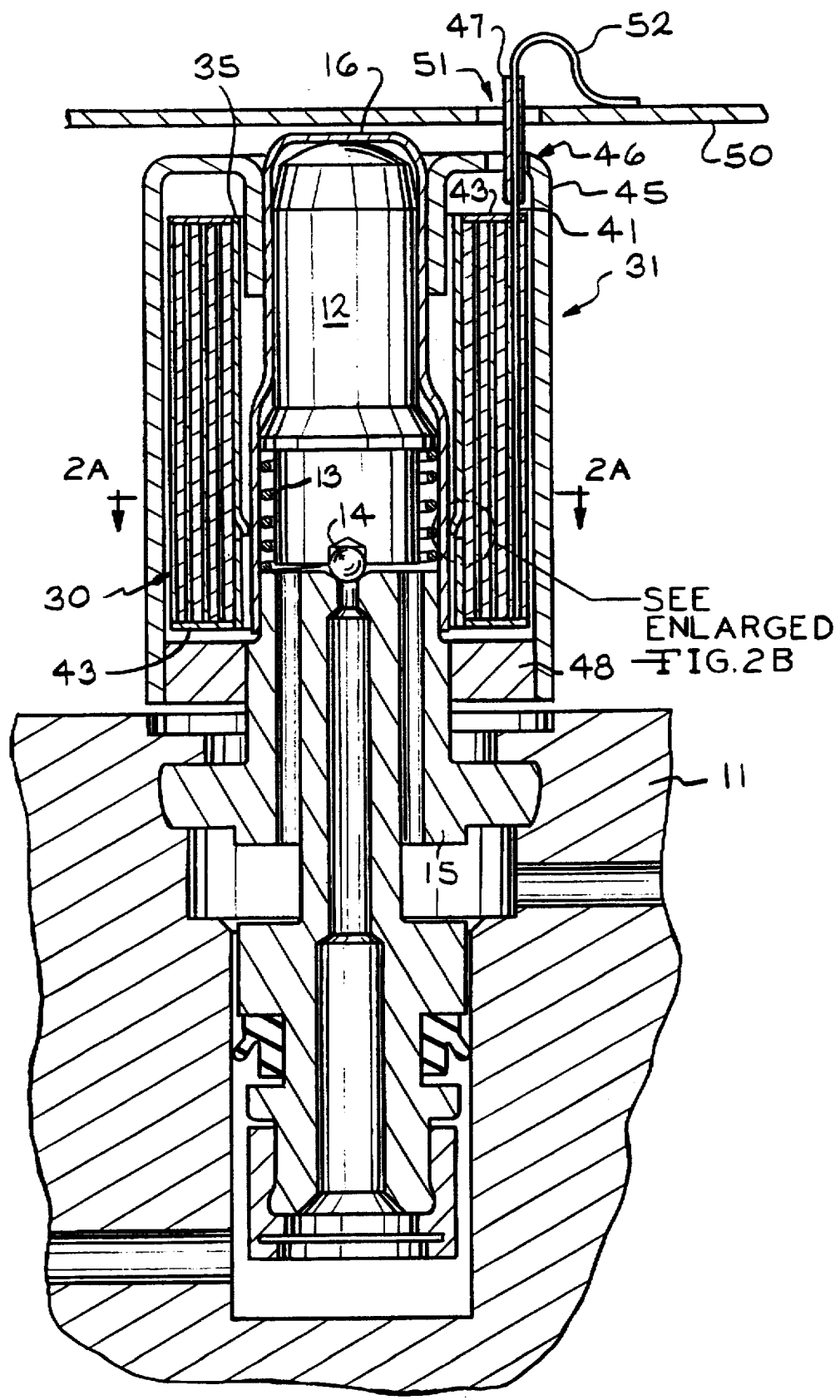
FIGS. 2, 2A, 2B, and 2C are views of an ABS solenoid valve which includes a foil wound coil in accordance with the invention.

Referring again to the drawings, there is illustrated in FIG. 2 an improved solenoid coil 30 wound from a conductive foil tape. The foil wound coil 30 is included in a solenoid valve 31. Components of the valve 31 which are the same as the valve 10 shown in FIG. 1 are identified by the same numerical designator.

Figure 2A:
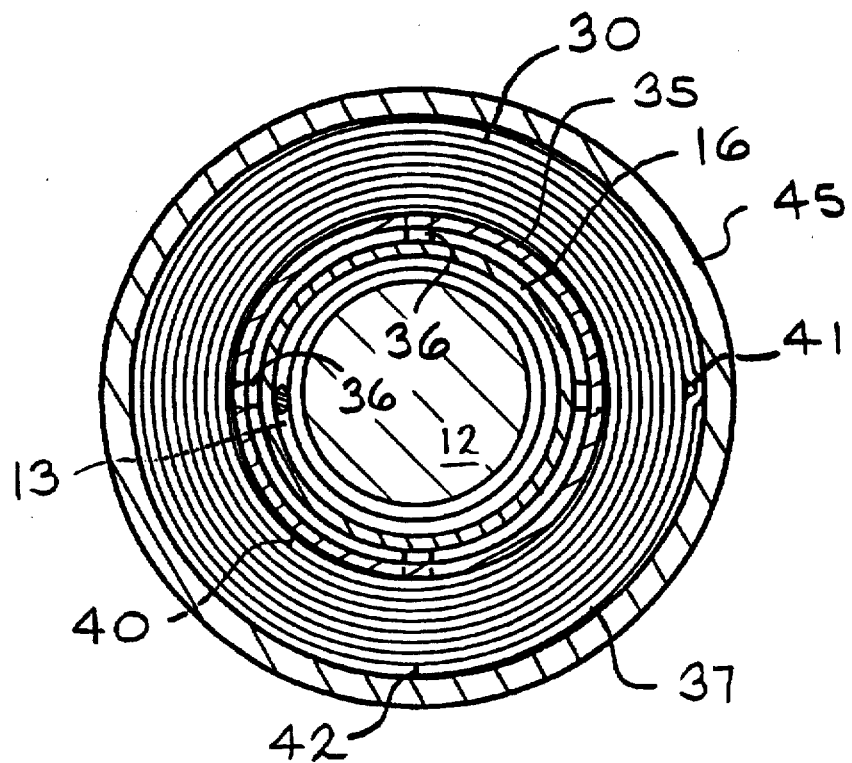
Figure 2B:
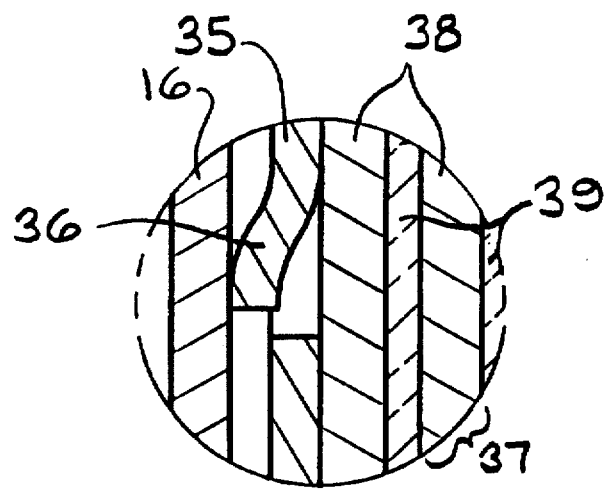

The foil wound coil 30 includes a thin central tube 35 formed from a electrically conductive metal, such as copper. As best seen in FIGS. 2A and 2B, a plurality of spring fingers 36 are formed in the tube 35. The fingers 36 extend in an axial inward direction and frictionally contact the valve sleeve 16. The purpose of the fingers 36 will be explained below.

A continuous length of an electrically conducting foil tape 37 is spiral wound by a conventional winding method onto the tube 35, as illustrated in FIG. 2A, to form the coil 30. For clarity, not all of the windings are shown in FIGS. 2 and 2A. The foil tape 37 includes a thin electrically conductive laminate 38 carried on a dielectric tape 39. In the preferred embodiment, the dielectric tape 39 consists of an insulating plastic base, such as a polyimide tape, while the laminate 38 is a layer of copper which is deposited upon one side of the tape 39 by a commercial process. One example of a polyimide tape which could be used is Kapton tape. Commercial processes for depositing the conductive laminate 38 layer upon the tape 39 can include electro-depositing the conductive material on one side of the tape or applying an adhesively backed foil formed form the conductive material upon the tape. Optionally, the foil tape 37 may have an adhesive coating on one side.

As best seen in FIG. 2B, the copper laminate 38 on the foil tape 37 faces inward and has a first end 40 forming an electrical connection with the central tube 35. The first end of the tape 40 can be secured to the tube 35 by a conventional method, such as soldering or welding. Alternately, a piece of tape or an adhesive can bond the tape end 40 to the tube 35. However, this is optional and the tape end 40 can be simply held against the tube 35 by the winding 30 itself.

An exemplary coil formed in accordance with the invention would be wound from a foil tape which is 0.668 in wide by 0.565 mils thick and approximately 12 yards long (16.97 mm wide by 0.01434 mm thick by 12 m long). The conductive laminate 38 would be a 0.190 mil (0.00483 mm) layer of copper carried on a 0.375 mil (0.00951 mm) thick dielectric tape 39. This geometry is equivalent to a conventional coil wound with #28½ magnet wire. A total of 270 turns would be wound onto the tube 35 to form the coil 30. The resulting coil 30 is 3.5 mm shorter than an equivalent conventional wire wound coil. Additionally, the replacement of a conventional wire wound coil bobbin with a thin sleeve is expected to reduce the diameter of the foil coil from that of an equivalent wire wound coil. It will be appreciated, however, that the invention can be practiced with other sizes of tapes and number of turns to fabricate coils having other electrical and/or magnetic characteristics.

The coil 30 includes a terminal wire 41 which, as will be explained below, is wrapped axially under the last winding and has a flexible end which extends in an axial direction from the upper end of the coil 30. The foil tape 37 has a second end 42 which is adhesively bound to the coil 30. If an adhesive tape is used to wind the coil 30, the adhesive will secure the second end of the tape 42. Alternately, an optional layer of tape can be wound about the periphery of the coil 30 to secure the second end 42.

In the preferred embodiment, the upper and lower ends of the conductive laminate 38 are recessed in an axial direction from the ends of the dielectric tape 39. The recesses reduce the potential of the layers of conductivelaminate 38 shorting across the dielectric tape 39. A ring 43 formed from an insulating tape film is placed over each end of the coil 30 for additional insulation and protection thereof. The rings 43 can be retained on the ends of the coil 30 by an adhesive or be formed with an adhesive coating.

The coil 30 is disposed within a cup-shaped steel flux return casing 45. The flux casing 45 has a terminal wire aperture 46 formed through the top thereof. As shown in FIG. 2, the terminal wire 41 extends through the flux casing arpeture 46. An electrically insulative sleeve 47 encloses the portion of the terminal wire 41 within the flux casing aperture 46 to prevent shorting of the wire 41 on the flux casing 45. A flux ring 48 is disposed within the open end of the flux casing 45 and retains the coil 30 within the casing 45. The flux ring 48 is secured within the casing 45 by a convention method, such as, for example, an interference fit, spot welding, dimples or swaging.

As shown in FIG. 2, the coil 30 is mounted upon a Printed Circuit Board (PCB) 50 which has electrical traces (not shown) deposited upon its upper surface. The PCB 50, which is included in an ABS electronic control module (not shown), carries electronic logic and switching components for energizing the coil 30. The PCB 50 has a terminal wire opening 51 formed therethrough. The coil terminal wire 41 extends through the PCB terminal wire opening 51. The terminal wire 41 is formed into a semi-circular loop 52 with a free end soldered to one of the electrical traces on the surface of the PCB 50. The terminal wire loop 52 allows lateral movement of the coil 30 relative to the PCB 50 to accommodate manufacturing tolerances of the assembled control valve (not shown).

As best seen in FIG. 2A, the coil 30 receives the sleeve 16 of the associated solenoid valve 31. Similar to the prior art valve 10 described above, the sleeve 16 contains a valve armature 12. The armature 12 is urged in an upward direction in FIG. 2 by a spring 13. A valve ball 14 is mounted upon the bottom surface of the armature 12. The valve ball cooperates with a valve seat 15 which is mounted in an ABS control valve body 11.

During operation of the coil 30, electric current is supplied to the terminal wire 41. The current flows through the foil tape 37 to generate a magnetic field. The current flows from the inner surface of the coil 30 and through the central tube 35 and the plurality of spring fingers 36 to the valve sleeve 16. The valve sleeve 16 is attached to the valve seat 15 which provides a return path for the electric current through the valve body 11. The spring fingers 36 establish a good electrical path between the central tube 35 and the valve sleeve 16.

An alternate embodiment of the foil wrapped coil includes a pair of flexible terminal wires (not shown). In the alternate embodiment, the foil tape is wound around a thin plastic tube with the copper laminate facing outward and the dielectric tape on the inner surface facing the valve sleeve. One terminal wire is wrapped axially between the first two windings to form an inner terminal lead while the other terminal wire is wrapped axially under the last winding, as described above, to form an outer terminal lead. The resulting foil wound coil has a conventional two (non-common) terminal lead arrangement with both terminal leads electrically connected to the PCB 50.

The invention further contemplates that the two terminal foil wrapped coil can be formed without a center tube (not shown). Such a coil would have an adhesive applied to the inner end of the foil tape. The adhesive would bond the inner layers of the coil together to define a central bore which extends through the coil. Additionally, a layer of electrically insulating tape can be wound upon the winding machine mandrel first with the foil tape wound over the insulating tape. The layer of insulating tape would form a lining in the coil bore to assure that the coil is insulated from the valve sleeve.

Figure 2C:
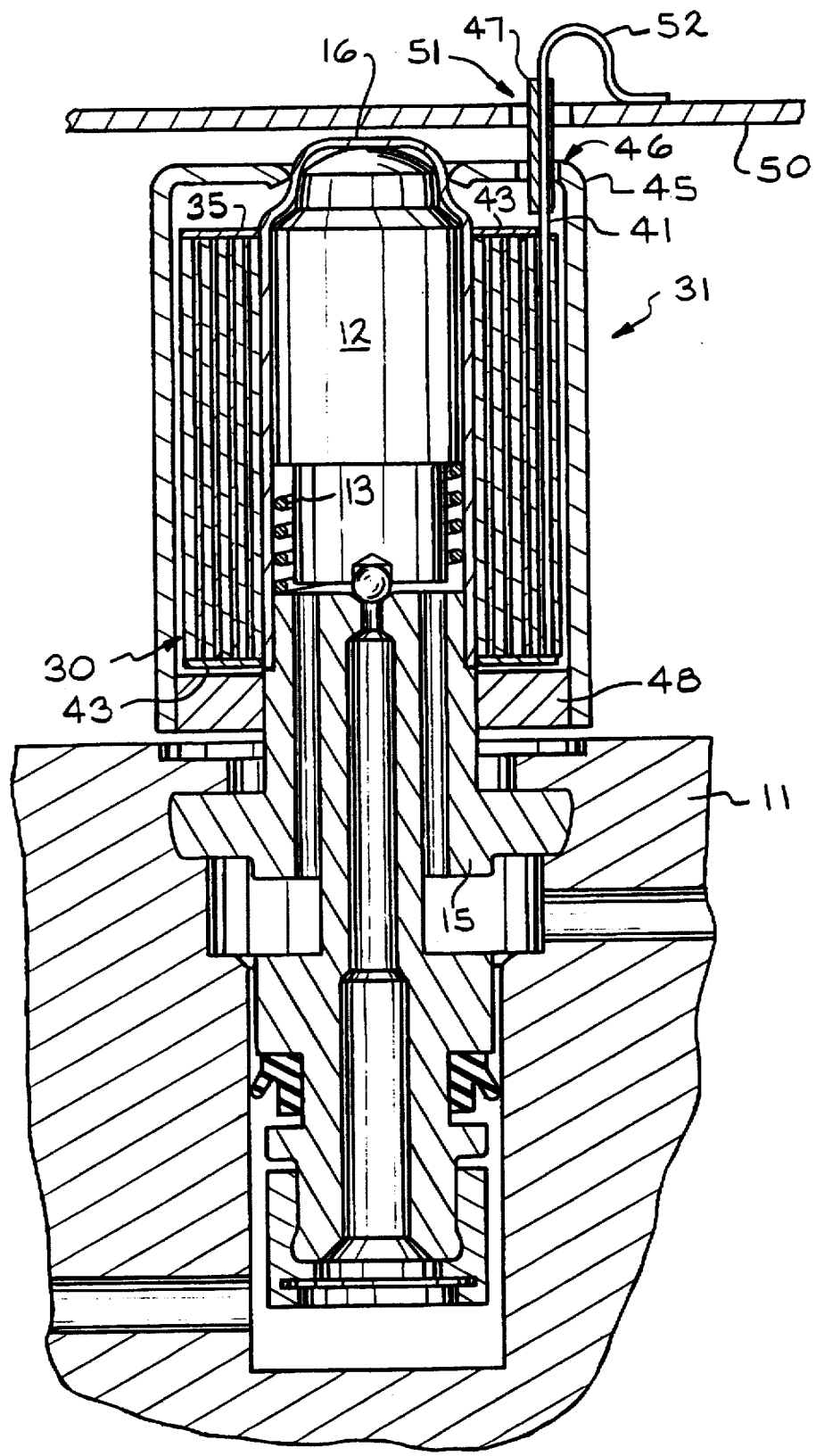

Another alternate embodiment contemplates winding the foil coil directly on the valve sleeve 15, as shown in FIG. 2C. This further reduces the solenoid coil diameter and can be used with either the single terminal option or conventional two terminal option described above.

Figure 3:
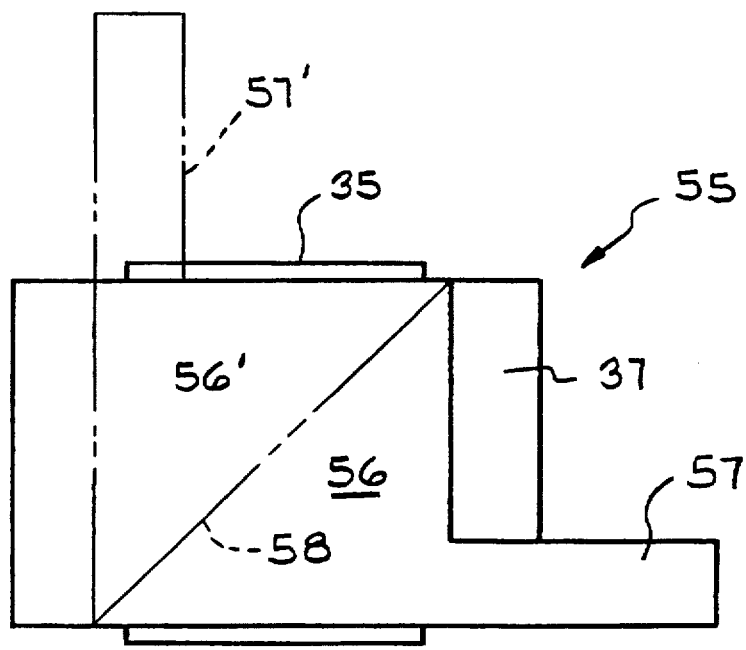
FIG. 3 is an elevation view of a foil wound coil having a foil lead formed in accordance with the invention.

The present invention also contemplates forming a coil lead, or terminal, from the end of the conducting foil tape 37. Such a coil terminal will be referred to as a foil terminal in the following discussion. A foil wound coil 50 having a foil terminal is illustrated in FIG. 3. The coil 50 includes foil tape 37 wound concentrically about an electrically conductive center post 35, as described above. The tape 37 has an end 56 which is not secured to the coil 55, but extends to the right in FIG. 3. A tab 57 extends horizontally from the bottom portion of the tape end 56.

To form the foil terminal, a portion of the tape end 56 and the tab 57 are folded upwardly about a diagonal fold line which is offset 45 degrees from the axis of the coil 55. The fold line is shown as a dashed line labeled 58 in FIG. 3. The folded position of the tape end 56 and the tab 57 is shown in phantom and labeled 56' and 57', respectively, in FIG. 3. The folded tab 57' extends axially in an upward direction from the upper end of the coil 55. The folded tape end 56' is adhesively bonded to the coil 55. Because one side of the folded tab 57' is electrically conductive, the folded tab 57' forms a foil terminal for the coil 55 which can be electrically connected to other control module components.

Figure 4:
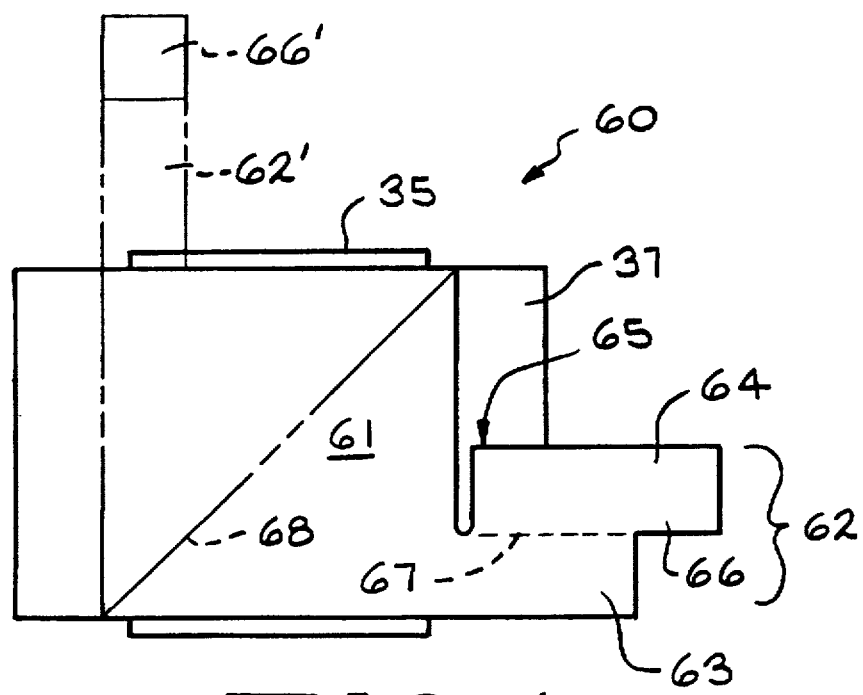
FIG. 4 is an elevation view of a foil wound coil having an alternate embodiment of the foil lead shown in FIG. 3.

An alternate embodiment of the foil terminal is illustrated in FIG. 4 which shows a foil wound coil 60. The coil 60 includes foil tape 37 wound concentrically about a center post 35, as described above. The tape 37 has an end 61 which is not secured to the coil 60, but extends to the right in FIG. 4. A tab 62 extends horizontally from the bottom portion of the tape end 61. The tab 62 includes a lower portion 63 which is connected to the bottom portion of the tape end 61 and an upper portion 64 which is separated from the tape end 61 by a vertical slit 65. The tab upper portion 64 includes a tip 66 which extends to the right beyond the tab lower portion 63 in FIG. 4.

To form a foil terminal, the tab upper portion 64 is folded down about a horizontal fold line 67 and the conductive layer of the tab upper portion 64 is adhesively bonded to the conductive layer of the tab lower portion 63. A portion of the tape end 61 is then folded upwardly about a diagonal fold line 68 and adhesively bonded to the coil 60, as described above. The folded tab forms an axially extending terminal having a tip at the upper end. The folded tab and terminal tip are shown in phantom and labeled 62' and 66', respectively, in FIG. 4. The folded tab terminal 62' has non-conducting dielectric material on both exposed surfaces; however, the terminal tip 66' has dielectric material on only one surface, exposing electrically conductive material for connection to other circuit components. It will be appreciated that the terminal 66' also can be formed by first folding about the diagonal fold line 68 and then about the tab fold line 67.

Figure 5:
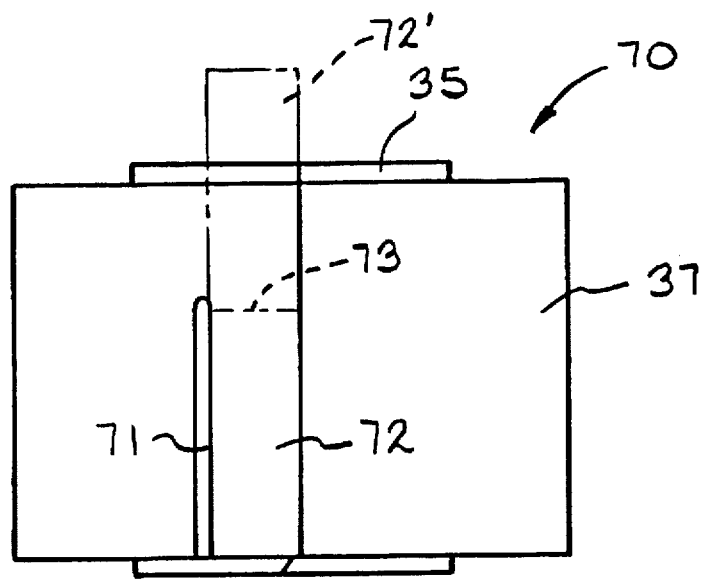
FIG. 5 is an elevation view of a foil wound coil having another embodiment of the foil lead shown in FIG. 3.

Another alternate embodiment of the foil terminal is illustrated in FIG. 5 which shows a foil wound coil 70. The coil 70 includes foil tape 37 wound concentrically about a center post 35, as described above. A vertical slit 71 forms a downwardly extending tab 72 in the end of the tape 37. The tab 72 is folded about a horizontal fold line 73 and adhesively bonded to the coil 70. The folded tab, which is shown in phantom and labeled 72', extends in an upward axial direction in FIG. 5 to form a coil terminal.

Figure 6:
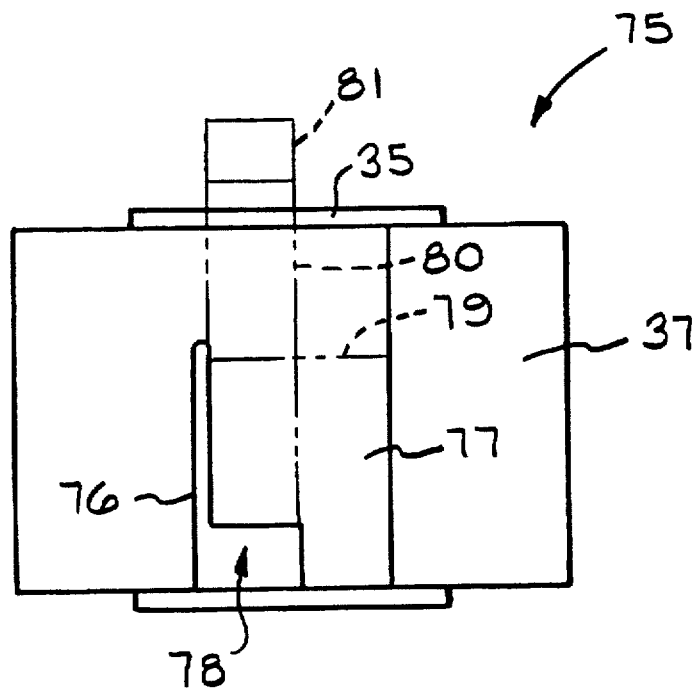
FIG. 6 is an elevation view of a foil wound coil having another embodiment of the foil lead shown in FIG. 3.

A third alternate embodiment of the foil terminal is illustrated in FIG. 6 which shows a foil coil 75. The foil coil 75 includes foil tape 37 wound concentrically around a center post 35. Similar to the coil 70 described above, a vertical slit 76 in the end of the tape 37 forms a tab 77. A rectangular recess 78 extends into the bottom of the tab 77 adjacent to the slit 76. The tab 77 is folded upwardly about a horizontal fold line 79 and adhesively secured to the end of the tape 37. The folded tab is then folded about a vertical fold line 80 and adhesively bonded to the coil 75 to form an axially extending terminal which is shown in phantom and labeled 81. The recess 78 provides a terminal tip with exposed electrically conducting material for connection to other control module components, while the remainder of the tab which extends above the coil 75 is electrically insulated by dielectric material.

Figure 7A:
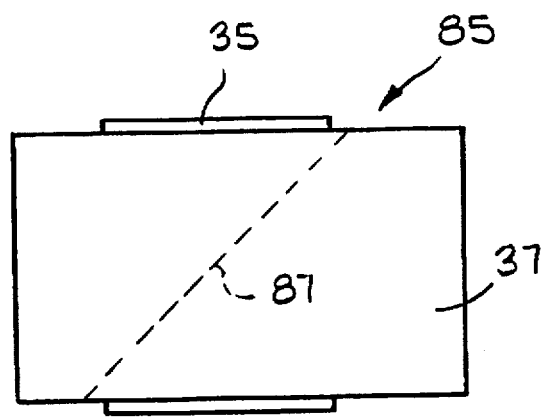
FIGS. 7A, 7B, 7C and 7D are views of a foil wound coil having another embodiment of the foil lead shown in FIG. 3.
Figure 7B:
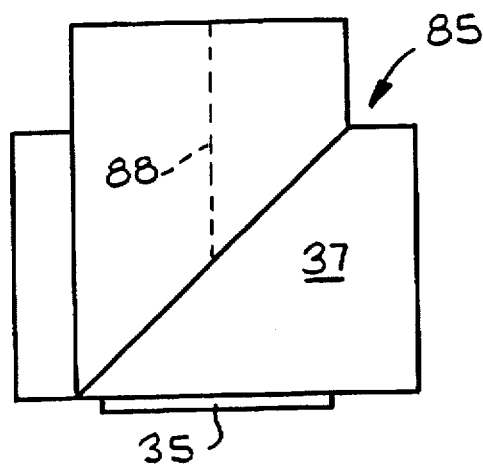
Figure 7C:
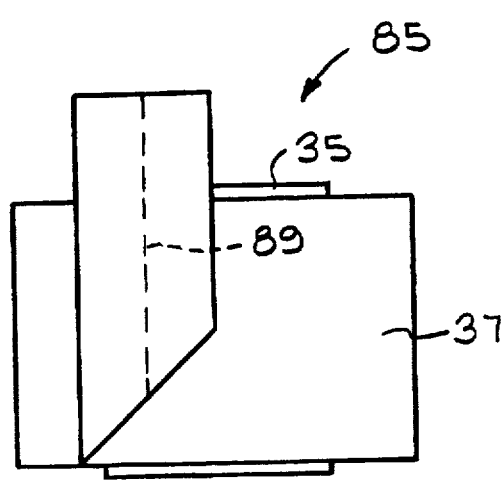
Figure 7D:
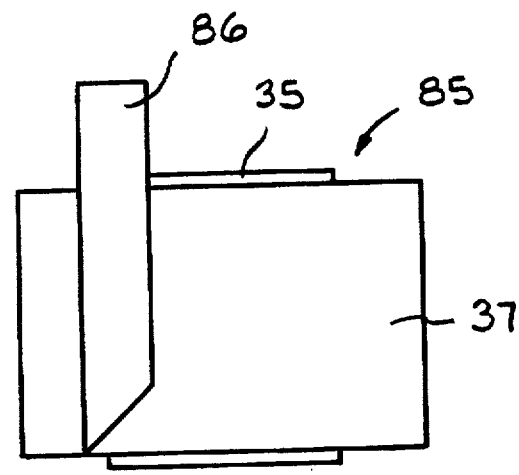

FIG. 7 illustrates a foil coil 85 having a foil terminal 86 which is shown in FIG. 7D and is formed by a three step sequential folding of the foil tape end, as illustrated in FIGS. 7A through 7D. In FIG. 7B, the foil tape end is folded upwardly about a diagonal fold line 87, similar to the folding methods described in the above embodiments. Next, the tape end is folded about a first vertical fold line 88 in FIG. 7C. Finally, the tape end is folded about a second vertical fold line 89 in FIG. 7D. The resulting terminal 86 includes four layers of foil tape and has the same cross-sectional area as the single layer of foil tape forming the winding on the coil 85. Accordingly, localized conductor heating as electric current flows through the terminal 86 is reduced.

Forming a foil terminal from the end of the conducting foil tape eliminates the need to wind a lead wire into the coil, thereby simplifying the process of fabricating the coil. While the coils illustrated in FIGS. 3 through 7 are shown as having one terminal formed on the outer end of the tape, it will be appreciated that the inner end of the tape can be similarly shaped and folded, before winding the coil, to form a second foil terminal.

Foil wound coils have a number of advantages over conventional wire wound coils. As described above, the foil wound coils have a reduced height from prior art conventionally wound coils. Accordingly, the height of the ABS control module can be reduced. Additionally, the elimination of the convention bobbin can reduce the diameter of the coil which can permit closer spacing of the valves in the valve body. This again allows a reduction in the overall control valve size. As result, the control valve requires less space in a vehicle and may be relocated to a more advantageous location in the vehicle. The flexible terminal leads allow for component misalignment without using flex-circuit. Also, as described above, the faster magnetic field collapse reduces the solenoid valve response time.

The invention also contemplates a method for simultaneously fabricating a number of foil wound solenoid coils. The method is illustrated by the flow chart shown in FIG. 8. In functional block 90, a long central tube formed form a conductive material is selected. The length of the tube is selected to match the width of commercially available wide foil tapes which vary from 36 to 57 inches. In the preferred embodiment, a 50 inch wide foil tape is used and a corresponding central tube having a length of 50 inches is selected. It will be appreciated, however, that other tape widths and corresponding tube lengths can be used.

Figures 9, 10:
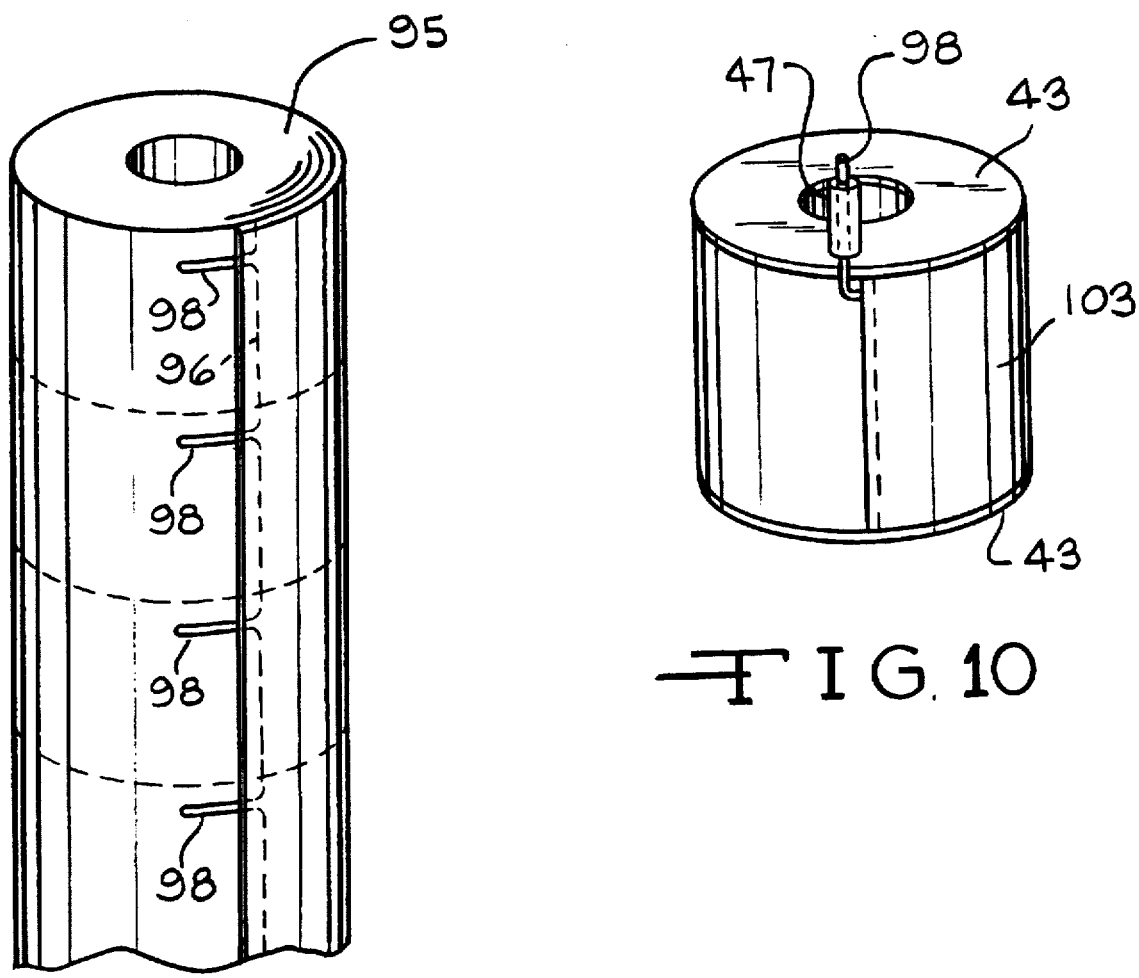
FIG. 9 is a perspective view of a long coil wound by the method illustrated in FIG. 8.
FIG. 10 is a perspective view of an individual foil wound coil sliced from the long coil shown in FIG. 9.

In functional block 91, the tape is spiral wound onto the tube to form a long coil 95, as shown in FIG. 9. During the winding operation, adhesive can be sprayed or brushed onto the tape. Upon curing, the adhesive bonds the layers of the foil together. However, the application of adhesive is optional.

Figure 8:
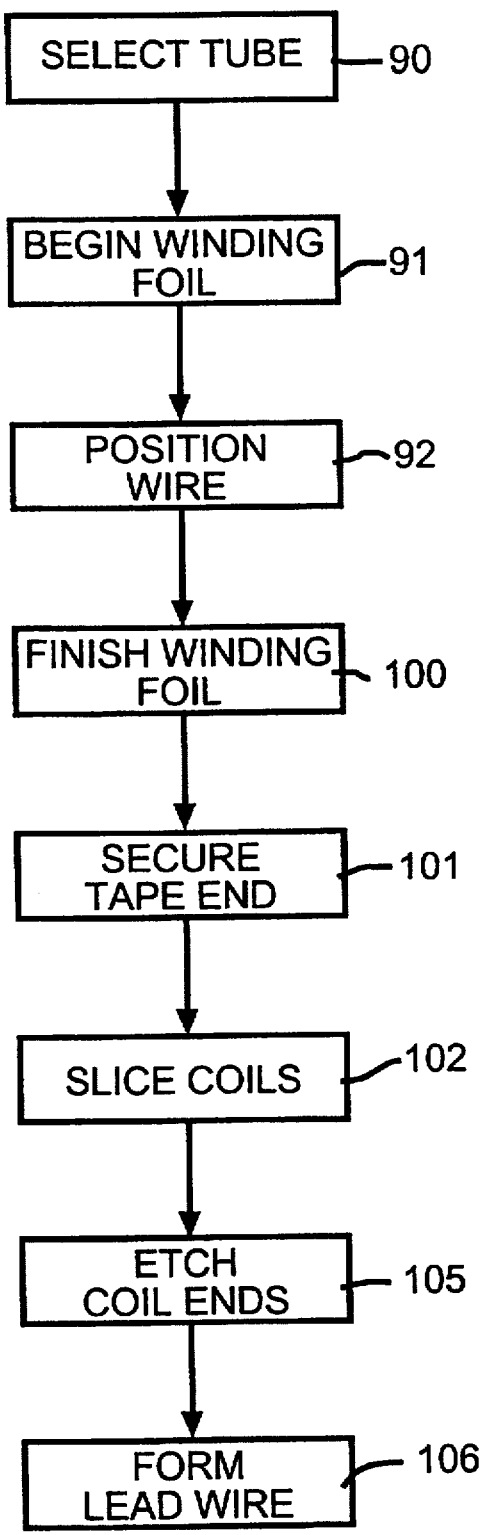
FIG. 8 is a flow chart for a method of forming the foil wound coil shown in FIG. 2.

As illustrated in FIG. 8 and described in functional block 92, a wire 96 is positioned axially on the coil 95 before winding the last turn of the coil 95. The wire 96 includes a plurality of loops 98 which extend perpendicular to the axis of the coil 95.

The winding of the long coil 95 is finished in functional block 100 to include cutting the foil tape. The cut end of the foil tape is adhesively bound to the coil in functional block 101 with the wire loops 68 extending beyond the tape end. In functional block 102, the tube and winding are sliced into a plurality of individual solenoid coils 103, one of which is shown in FIG. 10. In the preferred embodiment, the long coil 95 is laser sliced; however, other conventional slicing methods can be used. It is contemplated that one 50 inch long foil wound coil 95 would yield 75 individual solenoid coils 103.

After slicing, the ends of the individual coils 103 are placed in a copper etchant as shown in functional block 105. The etchant removes any copper smearing on the coil ends which would short out the coil turns. The etchant also removes the copper layer for a short axial distance of approximately 0.010 in. (0.25 mm) from each end of the coil 103 to further insulate the ends of the coil windings from each other and from metal subassembly components at the ends of the coils.

In functional block 106, a lead wire is formed by bending the wire loop 98 parallel to the axis of the coil 103 such that the loop 98 extends from the coil end for insertion through an associated opening in a flux return casing. As described above, a small insulating sleeve 47 can be placed over the loop 98 to prevent shorting the loop 98 on the flux return casing. Additionally, discs 43, as shown in FIGS. 2 and 10, formed from an insulating tape film can be placed over one or both ends of the coil 103 for insulation and protection thereof.

An alternate construction of a foil tape 110 for winding the coils is illustrated in FIGS. 11 and 12. As shown, the foil tape 110 includes a conductive material 111 carried by a dielectric tape 112. The conductive material 111 is narrower than the dielectric tape 112 and is positioned upon the dielectric tape 112 with both edges of the conductive material 111 recessed from the edges of the dielectric tape 112 to provide edge insulation. In the preferred embodiment, the conductive material 111 is centered upon the dielectric tape 112, however, it will be appreciated that the invention also can be practiced with the conductive material 111 offset from the centerline of the dielectric tape 112. Use of the tape 110 allows elimination of the step of etching the coil ends during coil fabrication, as shown in functional block 105 of the flow chart illustrated in FIG. 8. Additionally, the insulating discs 43 which were described above for covering the coil ends may not be needed.

In addition to recessing the conductive material from the edges of the dielectric tape, the conductive material also can be deposited upon the dielectric tape in discrete lengths corresponding to the length required to wind each individual coil. The tape would be cut between the discrete lengths as the individual coils are wound.

It is also contemplated that the end of each of the lengths of conductive material could formed for folding into a foil terminal. An exemplary formed end is illustrated in FIG. 13 where conductive material 115 is laminated onto the end of a dielectric tape 116 in a U-shape. A traverse slit 117 is cut partially across the tape 115 and the end of the tape is folded back along a vertical folding line 118. The end of the foil tape is then folded upward about a horizontal folding line 119 to form a foil terminal. It will be appreciated that the foil terminals illustrated in FIGS. 3 through 7 can be similarly formed in the end of the foil tape.

Figure 14:
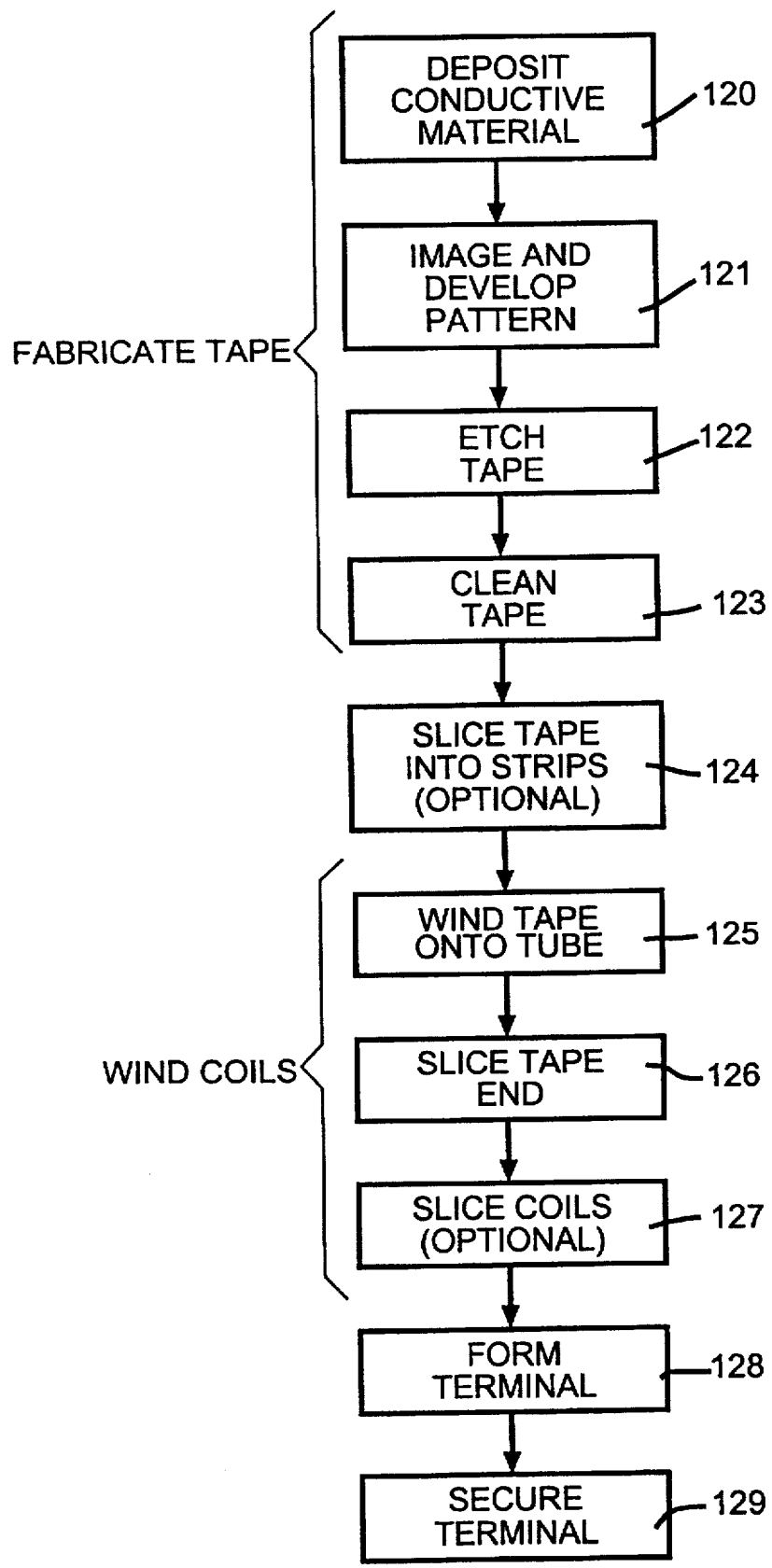
FIG. 14 is a flow chart of a method of forming the foil wound coils shown in FIGS. 3 through 7.

The present invention further contemplates combining a laminate plating process for manufacturing the foil tape with the winding of the foil coils. It is contemplated that the foil tape would be laminated in the same manufacturing facility as the coil winding apparatus with the tape fed directly from the tape laminating equipment to the coil winding apparatus. A flow chart for such a combined process is shown in FIG. 14. In functional block 120, a strip of dielectric tape is fed into a foil tape fabrication apparatus and a conductive material, which is copper in the preferred embodiment, is deposited upon the surface of the tape. A commercially available process is used to deposit the copper, such as lamination of a sheet of copper to the tape or electroless deposition of the copper onto the tape.

In functional block 121, a layer of resist, which may be a liquid or a dry film, is applied over the conductive material. A mask, which is formed in the desired pattern of the conductive material, is then placed over the resist. The mask covers a portion of the conductive material which is to be removed from the tape while exposing a portion of the conductive material which will remain on the finished tape. The tape is exposed to an ultraviolet light to develop the pattern by hardening the exposed resist. The mask is then removed.

The tape is passed through a bath in functional block 122 in which the unexposed resist is removed. The tape is then passed through an etching bath to remove the conductive material which is not covered by exposed, or hardened, resist. After etching, the remaining layer of conducting material has the desired shape.

The hardened resist is cleaned from the tape in functional block 123, leaving the conductive layer exposed. It will be appreciated that the steps shown in functional blocks 120 through 123 are illustrative of a typical foil tape fabrication process and that the invention contemplates using other commercially processes for depositing a conducting material on a dielectric tape.

If a wide tape for simultaneous winding of a plurality of coils is formed in the above steps, the conductive material is deposited in spaced apart parallel strips. The spacing between the strips includes the recesses shown in FIGS. 11 and 12. A wide laminated strip can be sliced into strips for winding individual coils in functional block 124. However, this step is optional and could be included to reduce the post winding slicing operation.

The laminated tape is fed into a coil winding apparatus in functional block 125 and the end of the tape is electrically bonded to a tube formed from a conductive material. The tape is then concentrically wound onto the tube. The end of the tape is sliced in functional block 126. If a wide tape is used, the tube and tape coil are sliced into individual coils in functional block 127. Since this step is only needed for a wide tape, the step is shown as being optional.

In functional block 128, the sliced tape end is formed into a foil terminal by one of the cutting and folding operations described above. The resulting foil terminal is adhesively bonded to the coil in functional block 129.

The process shown in FIG. 14 is described for forming coils having a single terminal, as illustrated in FIGS. 3 through 7. It will appreciated that the process can be modified to include a step for forming an inner foil terminal on the first end of the foil tape before feeding the tape into the coil winding apparatus. The inner foil terminal would be attached to the tube, which could be formed from an electrically non-conducting material. The coil winding would then proceed as shown in FIG. 14, to include forming a second outer foil terminal. The resulting coil would have a pair of foil terminals. Additionally, the invention contemplates that steps of the process illustrated by the flow chart in FIG. 14 and the process illustrated by the flow chart in FIG. 8 can be interchanged. Thus, a wire lead, as illustrated in FIGS. 9 and 10 can be substituted for the foil terminal formed in functional block 128 in FIG. 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been described as being applied to solenoid coils included in an anti-lock brake system, it will be appreciated that the invention can also be applied to solenoid valves in other systems, such as, for example, traction control systems and vehicle stability management systems. Additionally, while the preferred embodiment has been described as foil tape which includes copper as the conductive material, the invention also can be practiced with tapes having other conductive materials.

What is claimed is:

1. A coil for a solenoid valve comprising:
   a central tube; and
   a winding which includes an electrically conducting foil having an electrically conductive material carried by a flexible tape, said tape being spiral wound about said tube, said tape having an end which includes a folded portion, said folded portion including a tab which extends from an end of the coil, said tab forming a foil terminal.

2. A coil for solenoid valve comprising:
   a central tube formed from an electrically conducting material, said tube including a coupling portion having at least one finger extending inwardly from said tube, said finger being adapted to electrically contact a valve sleeve; and a winding which includes an electrically conducting foil having an electrically conductive material carried by a flexible tape, said tape being spiral wound about said central tube, said electrically conductive material contacting said central tube.

3. A coil as described in claim 2 further including at least one disc formed from an electrically insulative material is disposed upon an end of the coil.

4. A coil as described in claim 3 wherein said electrically conductive material is recessed from at least one edge of said dielectric tape.

5. A coil as described in claim 2 wherein the coil is mounted upon a solenoid valve which is included in an anti-lock brake system.

6. A solenoid valve comprising:

a valve body, said valve body including a valve seat;

a valve sleeve mounted upon said valve body, an axially movable an-nature disposed with said valve sleeve, said armature cooperating with said valve seat to open and close the valve; and a winding which includes an electrically conducting foil tape comprising an electrically conductive material carried by a flexible dielectric tape, said tape being spiral wound directly upon said valve sleeve.

7. A solenoid as described in claim 6 including at least one terminal formed at an end of said foil tape.

8. A coil for a solenoid valve comprising:

a spiral wound length of an electrically conducting foil tape which forms a self-supporting tubular winding without a separate central tubes said winding having a central bore extending therethrough, said central bore adapted to receive a valve sleeve, said tape having an electrically conductive material carried on a flexible dielectric tape with said dielectric tape facing toward said central bore, said tape further having an inner end which is adjacent to said central bore; and a layer of adhesive disposed upon a portion as said inner tape end, said adhesive bonding together the inner layers of said winding to form said central bore.

9. A coil as described in claim 8 further including a layer of an electrically insulating tape covering the inner surface of said central bore.

10. A method for forming coils for ABS solenoid valves comprising the steps of:

(a) providing a tube having a length which is a multiple of an individual coil;

(b) mounting the tube upon a coil winding machine;

(c) winding a length of an electrically conductive foil tape in a spiral about the tube, the foil tape having a width which corresponds to the length of the tube and including an electrically conductive material carried by a flexible dielectric tape;

(d) inserting a wire into the winding parallel to the axis of the tube, the wire having a plurality of loops formed therein which are spaced to provide one loop in each of the individual coil lengths;

(e) slicing the tube and tape winding into a plurality of individual coils; and (f) bending the loop wire parallel to the axis of the coil to form a lead wire.

11. A method for forming coils for ABS solenoid valves comprising the steps of:

(a) providing a tube having a length which is a multiple of an individual coil;

(b) mounting the tube upon a coil winding machine;

(c) winding a length of an electrically conductive foil tape in a spiral about the tube, the foil tape having a width which corresponds to the length of the tube and including an electrically conductive material carried by a flexible dielectric tape;

(d) slicing the tube and tape winding into a plurality of individual coils; and (e) placing at least one end of at least one of the individual coils in an etching fluid, the etching fluid dissolving a portion of the electrically conductive material.

12. A method as described in claim 11 further including, subsequent to etching the end of the coil, attaching a disc formed from an electrically insulative material to at least one end of the coil.

13. A method for forming coils for ABS solenoid valves comprising the steps of:

(a) providing a tube;

(b) mounting the tube upon a coil winding machine;

(c) winding a length of an electrically conductive foil tape in a spiral about the tube, the foil tape including an electrically conductive material carried by a flexible dielectric tape; and (d) forming a terminal by folding a portion of the end of the foil tape to form a foil tab which extends axially from an end of the coil.

14. A method as described in claim 13 also including inserting the foil coil into a flux casing having an arpeture formed therethrough, the foil terminal extending through the casing arpeture, and further including inserting a flux ring into the open end of the flux casing, the flux ring retaining the coil within the flux casing.

15. A method as described in claim 13 further including fabricating a foil tape comprising an electrically conductive material carried by a flexible dielectric tape and feeding the foil tape directly to the foil winding machine for winding the foil coil.

* * * * *